Feb. 4, 1941.   H. J. BYHRE   2,230,523
APPARATUS FOR PICKING UP ROCKS, ETC
Filed Aug. 29, 1939   5 Sheets-Sheet 2
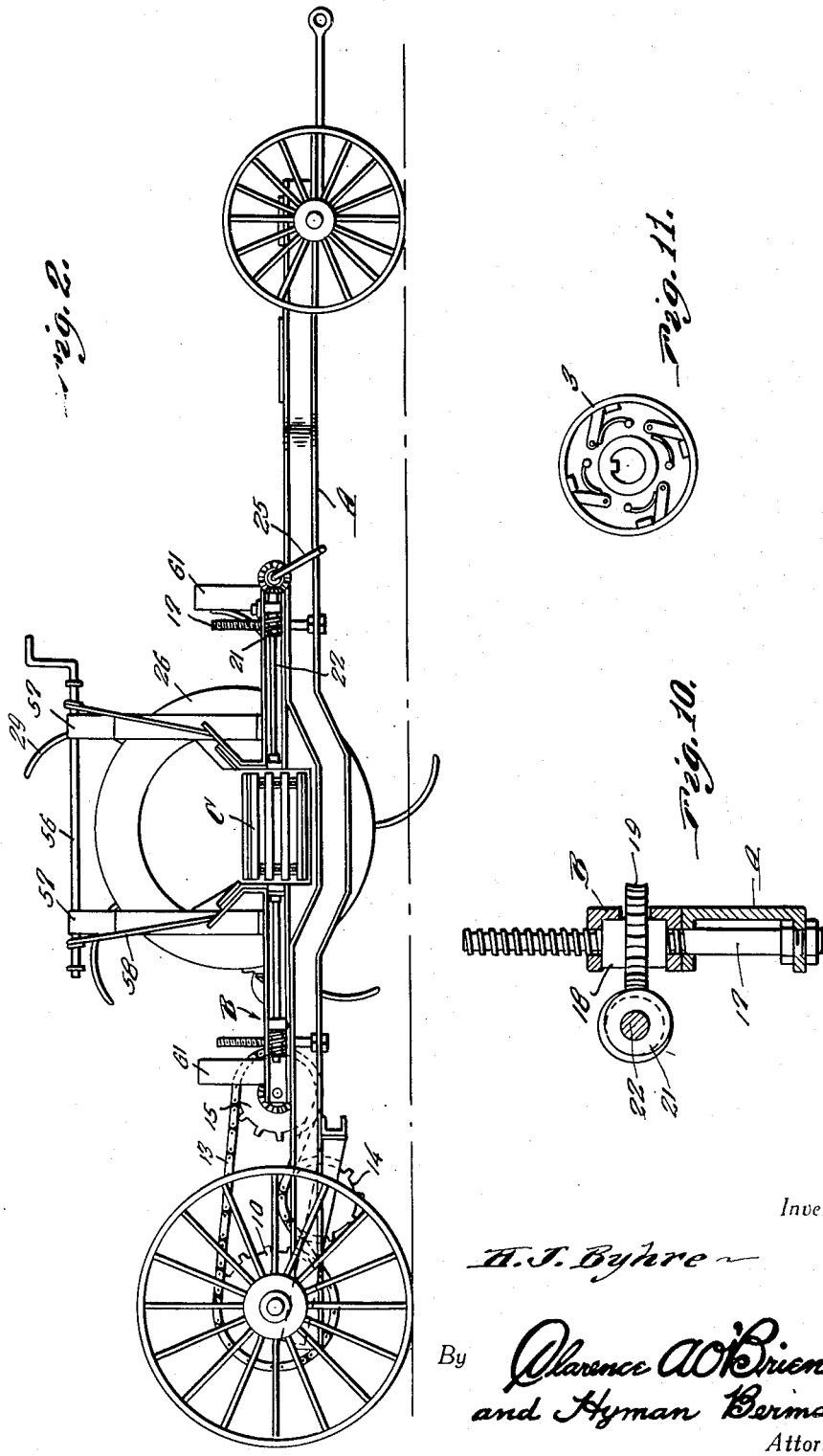
Inventor
*H. J. Byhre*
By *Clarence A. O'Brien
and Hyman Berman*
Attorneys

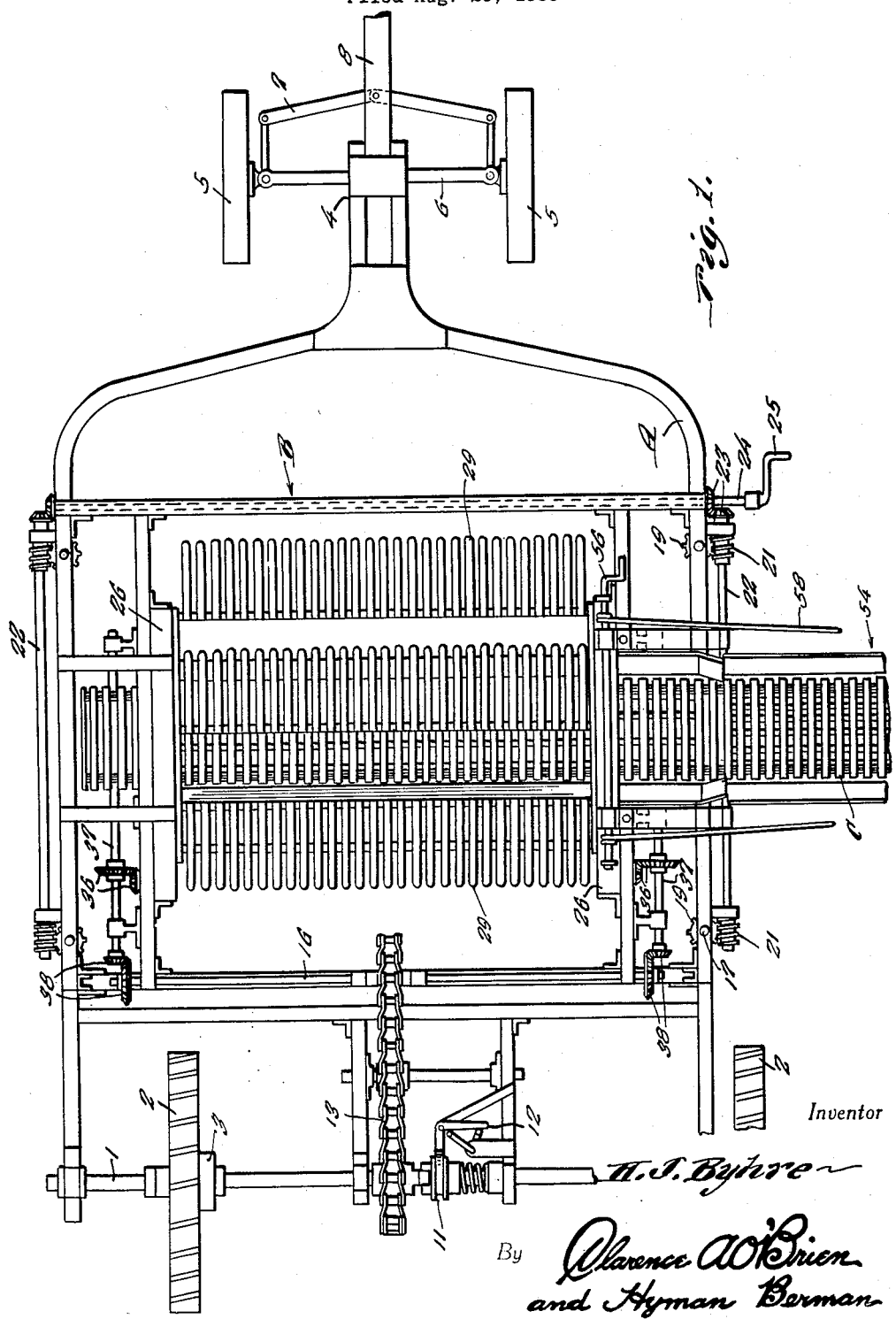

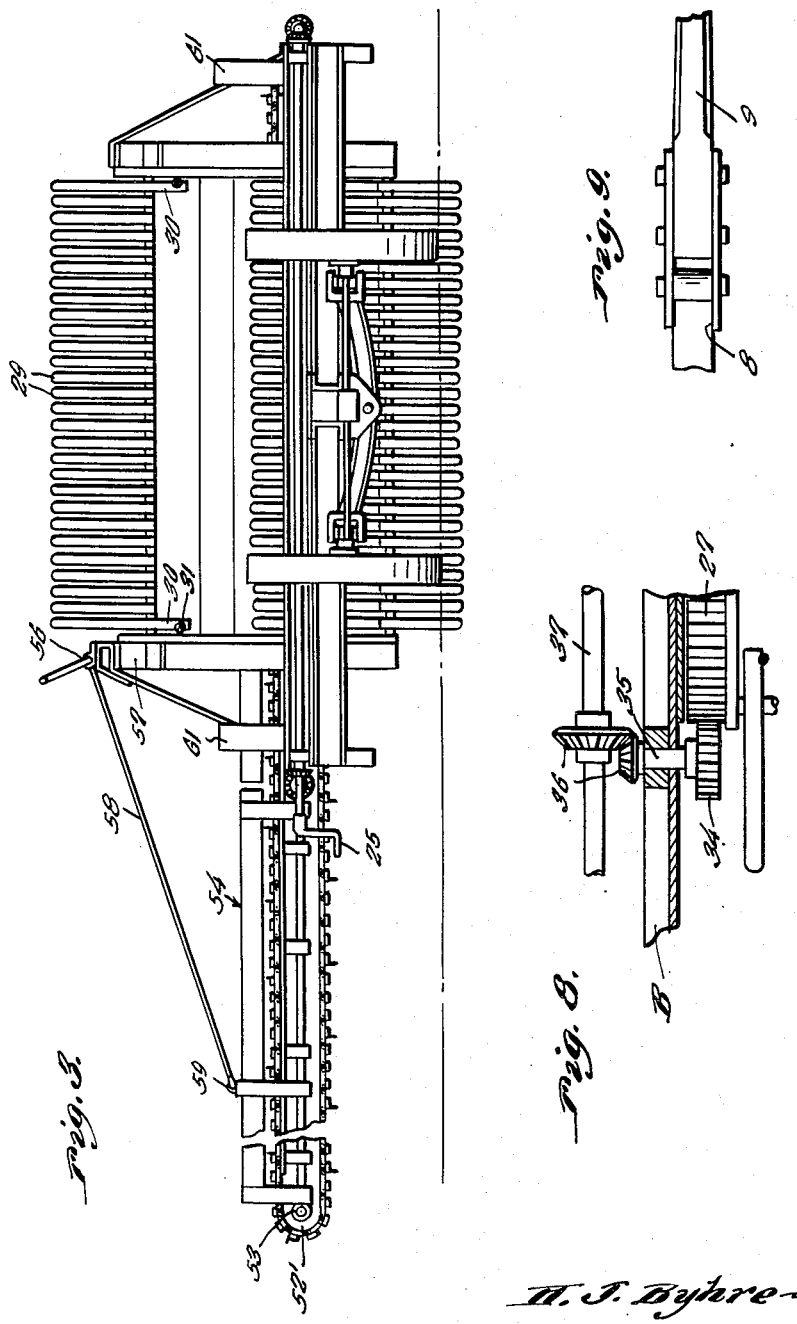

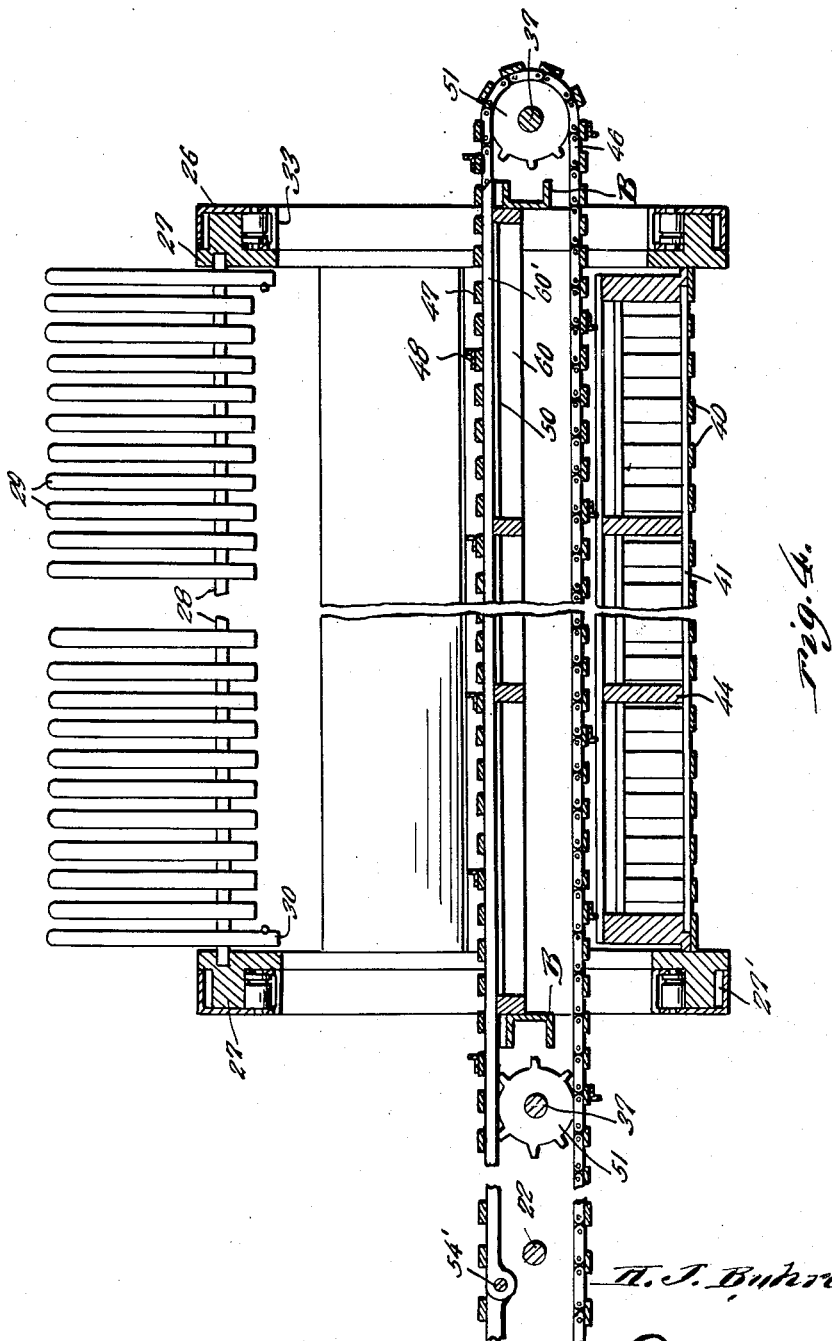

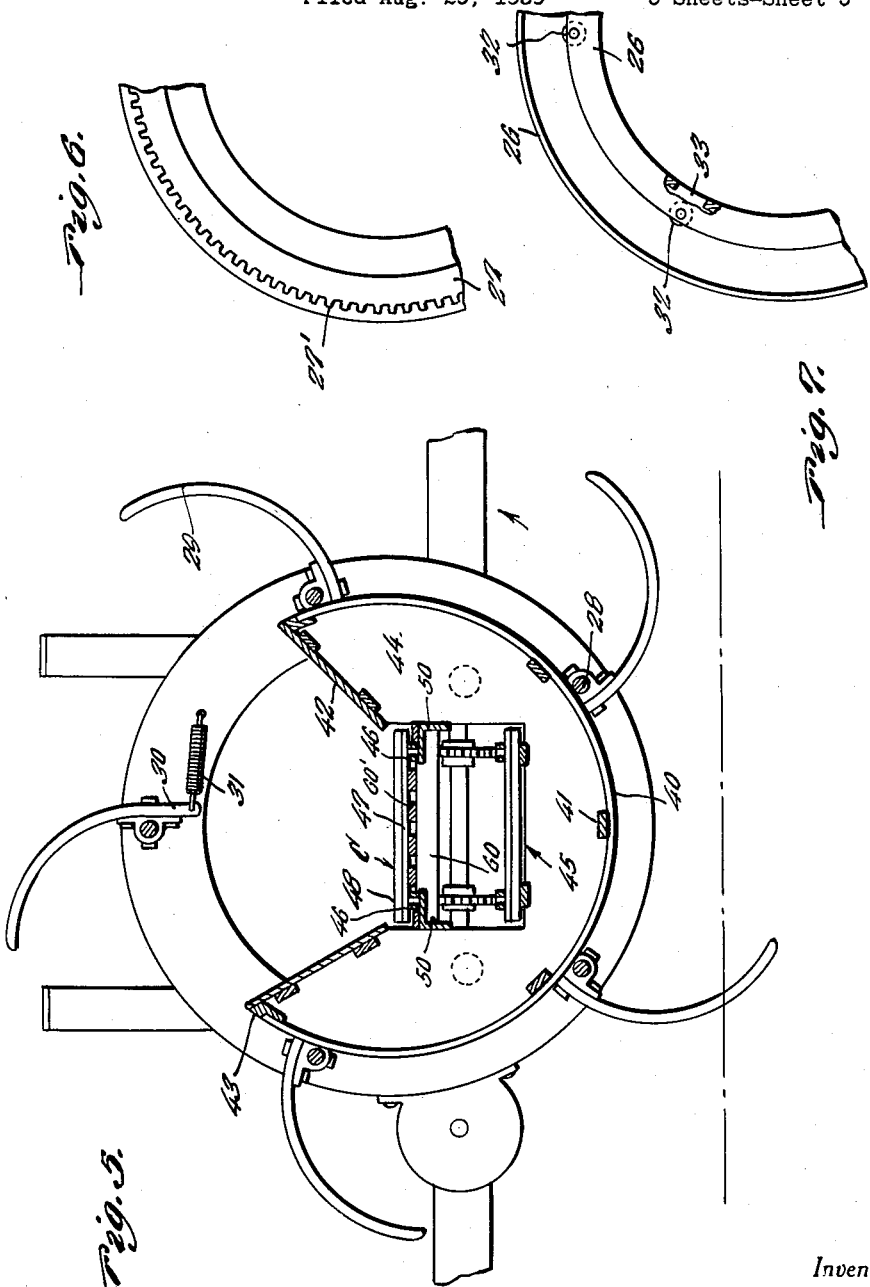

Patented Feb. 4, 1941

2,230,523

UNITED STATES PATENT OFFICE 2,230,523

APPARATUS FOR PICKING UP ROCKS, ETC.

Henry J. Byhre, Park Falls, Wis.

Application August 29, 1939, Serial No. 292,475

2 Claims. (Cl. 55—17)

This invention relates to an apparatus for picking up rocks, roots and other objects, the general object of the invention being to provide a main frame supported on wheels and adapted to be pulled across a field or other place where rocks or other objects are to be picked up with a vertically adjustable suplemental frame on the main frame having a rotary tooth carrying member thereon for picking up the objects and depositing them into a conveyor which conveys the objects to a point at one side of the apparatus.

A further object of the invention is to provide means for rotating the rotary member from some of the ground wheels and to provide manually operated means for adjusting the supplemental frame vertically.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which—

Figure 1 is a top plan view of the apparatus.

Figure 2 is a side view thereof.

Figure 3 is a front view of the apparatus.

Figure 4 is a vertical sectional view through the rotary tooth carrying member of a portion of the conveyor.

Figure 5 is a transverse sectional view through Figure 4 with parts in elevation.

Figure 6 is a fragmentary view of the tooth carrying portion of the rotary member.

Figure 7 is a fragmentary view of a track or roller carrying side part for the rotary member.

Figure 8 is a detailed sectional view showing the drive means for the rotary member.

Figure 9 is a fragmentary view showing how a tongue can be connected with the apparatus.

Figure 10 is a detail view of one of the vertically arranged screw shafts with the nut member thereon and showing the worm means for raising and lowering the nut member to raise and lower the coupling member frame.

Figure 11 is a view of the clutch means for connecting a rear wheel to the rear shaft.

In these drawings, the letter A indicates the main frame which at its rear carries the rear shaft 1 on which the rear wheels 2 are arranged, each wheel 2 being provided with an overrun clutch arrangement shown generally at 3 in Figure 11 for connecting the wheel to the shaft, said clutch means causing a wheel to drive the shaft when the wheel is rotating faster than the shaft but permitting the wheel to slip on the shaft if the shaft is being driven at a greater speed than the wheel, such as when the machine is making a turn and the shaft is being driven by one wheel faster than the other wheel is rotating.

A small truck 4 is connected with the front end of the main frame and includes the wheels 5 the spindles of which are pivotally connected with the axle 6 of the truck and said spindles being connected by the links 7 with the drawbar 8, this drawbar being adapted to be connected to a tractor or a tongue 9 can be connected to the bar 8, as shown in Figure 9, so that the apparatus can be pulled by a team of horses. A sprocket wheel 10 is rotatably arranged on the rear shaft 1 and is adapted to be connected with the shaft so as to rotate therewith by means of the clutch means 11 controlled by a lever 12. An endless chain 13 passes over this wheel 10 and over a lower idle sprocket 14 and over a sprocket 15 on a shaft 16.

A supplemental frame B of substantially rectangular shape is seated on the intermediate portion of the main frame A and portions of this supplemental frame are of channel iron construction, as shown in Figure 10. Four upright screw shafts 17 have their lower ends rigidly arranged in portions of the main frame (see Figure 10) and these screw shafts pass through portions of the channel iron parts of the supplemental frame and through the nut members 18 supported in said channel iron parts and each nut member has attached thereto a worm gear 19. The pair of gears 19 at each side of the apparatus is engaged by the worms 21 on a shaft 22 journaled in the main frame, these shafts 22 being connected by the beveled gears 23 with a cross shaft 24 journaled in the front of the supplemental frame and having a crank handle 25 at one end thereof. Thus by turning the shaft 24 by the handle 25 the shafts 22 are rotated which, in turn, rotate the four nut members 18 which cause said nut members to move vertically on the screw shafts 17 so as to raise or lower the supplemental frame in accordance with the direction of rotation of the shaft 24. The shaft 16 before referred to is journaled in the rear of the supplemental frame so that this shaft is driven from the rear shaft as the machine is pulled along a field or a place where it is desired to pick up objects.

Adjacent the ends of the supplemental frame are the vertically arranged ring-shaped guiding members or tracks 26 in each of which is rotatably arranged a ring gear member 27, the two ring gear members being connected together by the bars 28 each of which has attached thereto a plurality of curved teeth or fingers 29, the ends of each bar being rotatably arranged in a member 27 with the inner ends of the end teeth extended as shown at 30 in Figure 3 and in Figure 5, and springs 31 are connected to said extended ends and to the members 27 to yieldingly hold the row of teeth on each bar in a certain position but permitting the fingers to move rearwardly if they strike an object which they cannot pick up. This will prevent damage to the parts. Each of the members 26 is provided with the rollers 32 on which the member 27 rides, as shown more particularly in Figure 4 and said member 26 is formed with an opening 33 under each roller for permitting a roller to be readily removed and replaced by a new one when worn. The rack teeth of each member 27 are shown at 27' and the teeth of each member are engaged by a toothed wheel 34 carried by a stub shaft 35 journaled in the supplemental frame and beveled gears 36 connect the stub shaft 35 with a shaft 37, one of which is journaled at each side of the supplemental frame and these shafts 37 are connected by the beveled gears 38 with the shaft 16. Thus the members carrying the teeth or fingers are rotated from the shaft 16 through means of the shafts 37.

The rotary assembly rotates around a substantially circular rack which is open at its upper portion and which is composed of the arcuate bands 40 and the longitudinally extending strips 41. Downwardly converging plates 42 are connected to the upper side edges of the rack, these side edges being formed by the strips 43. A plurality of substantially arcuate-shaped members 44 are located in spaced relation in the rack and the plates 42 are connected with the upwardly diverging ends of these members 44 as shown in Figure 5. Each member 44 has a substantially rectangular opening or recess 45 therein from the upper side walls of which the plates 42 diverge and a transversely arranged conveyor C passes through the rack and through these recesses or openings 45 so as to receive the material picked up by the fingers or teeth 29 and dropped into the space formed by the plates 42 at the top of the rack. This conveyor is composed of the endless members 46 and the cross strips 47, some of which have attached to their outer faces the angle irons 48. The upper parts of the endless members run on brackets 50 and said members 46 pass over toothed wheels 51 on the shafts 37 and other sprockets 52' carried by shaft 53 carried by an extension frame 54 of the conveyor which extends to one side of the apparatus. This extension frame 54 can be raised and lowered on the pivot 54' by means of a manually rotated shaft 56 supported on the uprights 57 at one side of the supplemental frame and over which the cables 58 pass which are connected with the outer end of the frame 54 as shown at 59. The upper reach of the conveyor is supported by the frame 60 which includes the longitudinally extending slats 60'.

Thus it will be seen that as the machine is pulled along the teeth carrying member is caused to rotate so that the teeth will dig into the ground and lift up stones and other objects and deposit them upon the conveyor which moves the objects to one side of the machine where they can be deposited into a wagon or the like. As before stated the supplemental frame can be raised and lowered by turning the shaft 24 and said frame is guided in its vertical movement by means of the guides 61.

By placing steel blades over the teeth and a steel jacket over the arcuate-shaped rack and covering the conveyor with belting the device can be made to handle dirt and sod.

Digging teeth may be attached to the front part of the main frame A to loosen the soil and any rocks therein so that these rocks can be easily picked up by the rotating teeth.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In a device of the class described, a supporting frame, a drum-like rack supported by the frame and including a plurality of vertically arranged substantially arcuate-shaped members spaced apart and each having a substantially rectangular shaped opening therein with the ends of the arcuate-shaped members sloping upwardly and outwardly from the rectangular opening, longitudinally extending bars connecting the arcuate members together, arcuate strips connected with the bars between the arcuate members, longitudinally extending plates connected with the upwardly and outwardly sloping ends of the arcuate members, conveying means passing through the rack and passing through the rectangular-shaped openings in the arcuate members and on which conveyor means the plates direct material dropping upon such plates, a drum surrounding the rack and rotatably supported, fingers carried by the drum for picking up articles and dropping them onto the conveyor means and means for rotating the drum.

2. In a device of the class described, a wheel supported frame, a pair of spaced vertically arranged ring-shaped members, each of channel shape in cross section with the open part facing inwardly, rollers supported in said channels, ring gears rotatably arranged in the ring-shaped members and engaging the rollers, rods connecting the ring gears together, teeth carried by the rods, the end teeth being extended, springs connected with the extended ends of said end teeth and connected with the ring gears for yieldingly holding the teeth on each rod in a certain position, shafts, gears thereon meshing with the teeth of the ring gears and means for rotating said shafts.

HENRY J. BYHRE.